United States Patent
Courtney et al.

[11] 3,838,712
[45] Oct. 1, 1974

[54] STRUCTURAL FITTING FOR FILAMENT COMPOSITE TUBULAR MEMBER

[75] Inventors: Albert L. Courtney; Floyd P. Weldy, both of South Bend, Ind.

[73] Assignee: The Bendix Corporation, South Bend, Ind.

[22] Filed: Nov. 30, 1972

[21] Appl. No.: 310,753

[52] U.S. Cl. ............................. 138/103, 138/106
[51] Int. Cl. ........................................ F16l 3/00
[58] Field of Search ........... 138/103, 106, 107, 108, 138/109, 102, 113; 174/79; 248/49, 62, 74

[56] References Cited
UNITED STATES PATENTS

| | | | |
|---|---|---|---|
| 3,030,253 | 4/1962 | St. John et al. | 138/DIG. 3 |
| 3,224,795 | 12/1965 | Conley | 138/109 X |
| 3,228,678 | 1/1966 | Koger | 138/109 X |

*Primary Examiner*—Charles A. Ruehl
*Attorney, Agent, or Firm*—Gordon H. Chenez; William N. Antonis

[57] ABSTRACT

A fitting adapted to be secured in force transmitting relationship to a filament composite or filament reinforced matrix bound tube. A portion of the tube between the ends thereof is provided with two integral conical sections. An annular lug member having a cone or funnel shaped wall is adapted to bear against one of the conical sections. A tapered ring is interposed between a spanner nut and the second of the conical sections which spanner nut is threadedly engaged with the lug member. The spanner nut is tightened to draw the ring and lug member against the respective conical sections, thereby fixedly securing the fitting in position on the filament composite tube. A suitable adhesive may be applied between mating surfaces of the tube, lug member, and ring to provice additional bond therebetween. The cone or funnel shaped wall may be constructed to permit the lug member to telescope on the tube relative to the conical sections thereof in which case a split annular collet or sleeve is interposed between the funnel shaped wall and adjacent conical section to compensate for the diametrical difference between the same. Another embodiment of the subject fitting suggests a split annular collet or sleeve interposed between the tube and lug member as well as the ring member and provided with conical inner and outer wall portions which mate with the respective conical walls of the tube, lug member, and ring member.

16 Claims, 4 Drawing Figures

3,838,712

STRUCTURAL FITTING FOR FILAMENT COMPOSITE TUBULAR MEMBER

The invention herein described was made in in the course of or under a contract or subcontract thereunder with the United States Department of the Air Force.

BACKGROUND OF THE INVENTION

It is well known that filament composite or filament reinforced matrix bound tubular members may be substituted for metal structural members with corresponding advantages of lighter weight, corrosion resistance, cost, etc. The matrix binding the filaments may be of any suitable pliable metal or plastic material capable of thermo setting or otherwise hardening to a desired tube shape. The strength characteristics of metal and filament reinforced matrix bound tubular members compare favorably for most applications. However, it has been found that a filament reinforced matrix bound tubular member is vulnerable to structural failure in a region thereof subject to stress concentration arising from force transmitting structural fittings or the like having a positive connection with the tubular member. Normally a filament composite tubular member requires a distribution of applied force over a greater area in comparison to an equivalent metal tubular member to avoid overstress. Furthermore, conventional practice in attaching structural fittings to filament composite tubular members is not entirely satisfactory due to failure to maintain a positive connection between the tubular member and structural fitting.

It is an object of the present invention to provide a simple and effective fitting for establishing a positive connection between a structural fitting and filament composite tubular member.

It is another object of the present invention to provide a force transmitting fitting for positively connecting a structural member to a filament reinforced matrix bound tubular member and adapted to minimize stress concentration on the tubular member.

Other objects and advantages of the present invention will be apparent from the following description taken with the accompanying drawings.

DESCRIPTION OF THE PREFERRED EMBODIMENT

Figure 1:
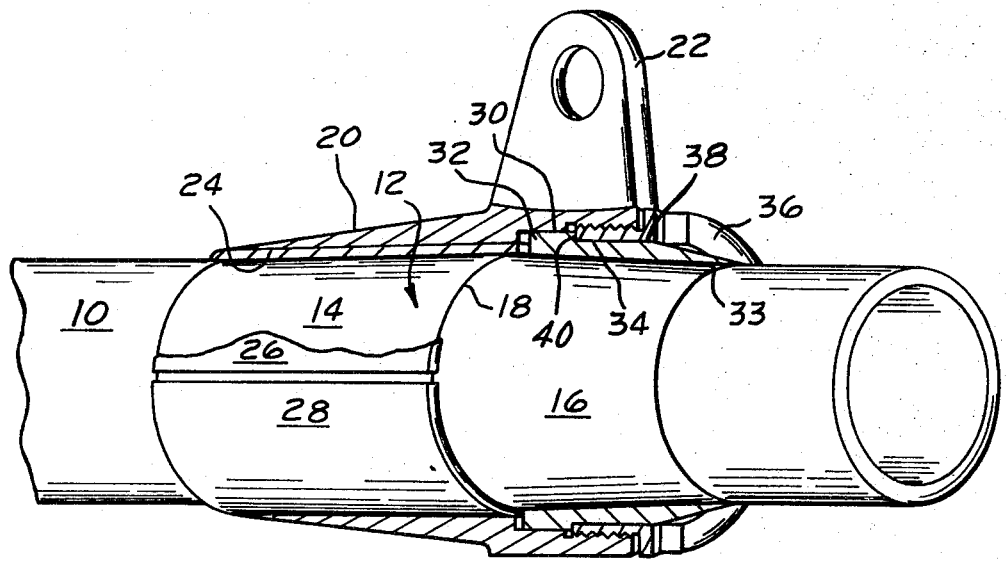
FIG. 1 represents an orthographic view of a filament composite tubular member and attached fitting embodying the present invention.

Referring to FIG. 1, numeral 10 designates a filament composite or filament reinforced matrix bound tubular member which may be formed by any one of various known methods as, for example, that shown in U.S. Pat. No. 3,106,940 issued Oct. 15, 1963 to R. E. Young.

Intermediate its ends, the tubular member 10 is provided with an integral enlarged diameter portion 12 defined by two conical or ramp sections 14 and 16 having a common base.

An annular tubular metal fitting or lug ring generally indicated by 20 is provided with an integral lug portion 22 extending radially outwardly therefrom and adapted to be connected to suitable actuating means or support means, not shown. The interior wall 24 of ring 20 is cone or funnel shaped having an angle of taper equal to that of conical section 14 and sloping in the same direction as conical section 14. An annular split sleeve or collet defined by half sections 26 and 28 is interposed between tubular fitting 20 and conical section 14 and adapted to be wedged in a progressively tighter manner against wall 24 and conical section 14 as fitting 20 is displaced toward the right relative to tubular member 10 as viewed in FIG. 1.

The interior wall 24 is provided with an annular recess 30 which is adapted to receive one end of an annular bushing or ring 32. The inner wall 33 of bushing or ring 32 is cone or funnel shaped having an angle of taper equal to that of conical section 16 and sloping in the same direction as conical section 16. The bushing or ring 32 is recessed as at 34 to provide adequate spacing between ring 32 and ring 20 for entry therebetween of an annular spanner nut 36 threadedly engaged with a threaded portion 38 of recess 30. The nut 36 is adapted to bear against end wall or shoulder 40 defined by recess 34 such that tightening nut 36 results in engagement of ring 32 with conical section 16 and subsequent drawing of fitting 20 axially toward ring 32 thereby wedging the collet half sections 26 and 28 securely in position against fitting 20 and tubular member 10. Sufficient clearance between ring 32 and the end wall of recess 30 is maintained to avoid bottoming of ring 32 against fitting 20.

The above described positive engagement of fitting 20 with tubular member 10 by virtue of the above described wedging action provides for distribution of force over the relatively large area of the conical sections 16 and 14 tubular member against which ring 32 and collet half sections 26 and 28 bear and further minimizes any opportunity for undesirable stress concentration on tubular member 10.

The above described structure is particularly adapted for use on member 10 when one end thereof is provided with a shape or attachment, not shown, which precludes telescoping tubular fitting 20 over tubular member 10. It will be assumed that the left hand end of tubular member 10 as viewed in FIG. 1 has such a shape or attachment, not shown. It will be understood that assembly is accomplished by sliding the fitting 20 over the unobstructed right hand end of tubular member 10 to a position clearing the conical sections 14 and 16. The collet half sections 26 and 28 are inserted in fitting 20 and the resulting assembly moves axially into seating engagement with conical section 14. The ring 32 with spanner nut 36 positioned thereon may be slipped over tubular member 10 into position on fitting 20 and spanner nut 36 rotated by a suitable wrench to draw ring 32 into seated engagement with conical section 16 and fitting 20 against collet half sections 26 and 28 which, in turn, seat against fitting 20 and conical section 14. The above described assembly procedure may be reversed to disassemble the above described structure.

If desired, the mating surfaces of the fitting 20, ring 32 collet half sections 26 and 28 and conical sections 14 and 16 may be provided with a suitable adhesive such as a dry film adhesive or elastomer to further secure the assembly in position on tubular member 10.

Figure 2:
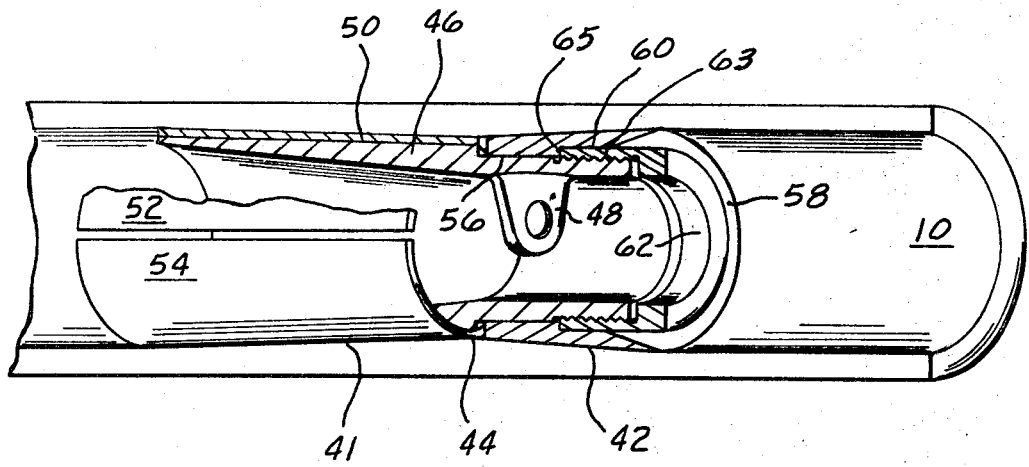
FIG. 2 represents an orothographic view of a second embodiment of the present invention.

Referring to FIG. 2, the present invention is shown installed on the interior of tubular member 10. Conical or ramp sections 41 and 42 having common base 44 are provided on the interior wall of tubular member 10. Annular tubular fitting 46 is provided with lug portion 48 extending radially inwardly therefrom and adapted to be connected to actuating means or support means, not shown, extending axially through tubular member 10. The exterior wall 50 of tubular fitting 46 is cone or funnel shaped with an angle of taper equal to that of conical section 41 and sloping in the same direction. Annular split sleeve or collet defined by half sections 52 and 54 is interposed between tubular fitting 46 and conical section 41 and adapted to be wedged therebetween as fitting 46 is displaced toward the right relative to tubular member 10 as viewed in FIG. 2. The exterior wall 50 is provided with an annular recess 56 adapted to receive one end of an annular bushing or ring 58. The outer wall of bushing 58 is cone or funnel shaped and provided with an angle of taper equal to conical section 42 and sloping in the same direction. The bushing 58 is recessed at 60 to provide adequate spacing between fitting 46 and bushing 58 for entry therebetween of an annular spanner nut 62 threadedly engaged with a threaded portion 63 of recess 56. The nut 62 bears against a shoulder 65 defined by recess 60 such that tightening of nut 62 results in engagement of bushing 58 with conical section 42 and subsequent drawing of tubular fitting 46 axially toward bushing 58 thereby wedging the collet half sections 52 and 54 securely in position against tubular fitting 46 and tubular member 10. Clearance is provided between bushing 58 and the end wall of recess 56 to prevent bottoming of bushing 58 against tubular fitting 46.

Assembly of the above described structure of FIG. 2 is accomplished in the same manner as in the case of FIG. 1 with the obvious requirement that the tubular fitting 46, collet sections 52 and 54, bushing 58 and spanner nut 62 be inserted interiorly of tubular member 10.

Figure 3:
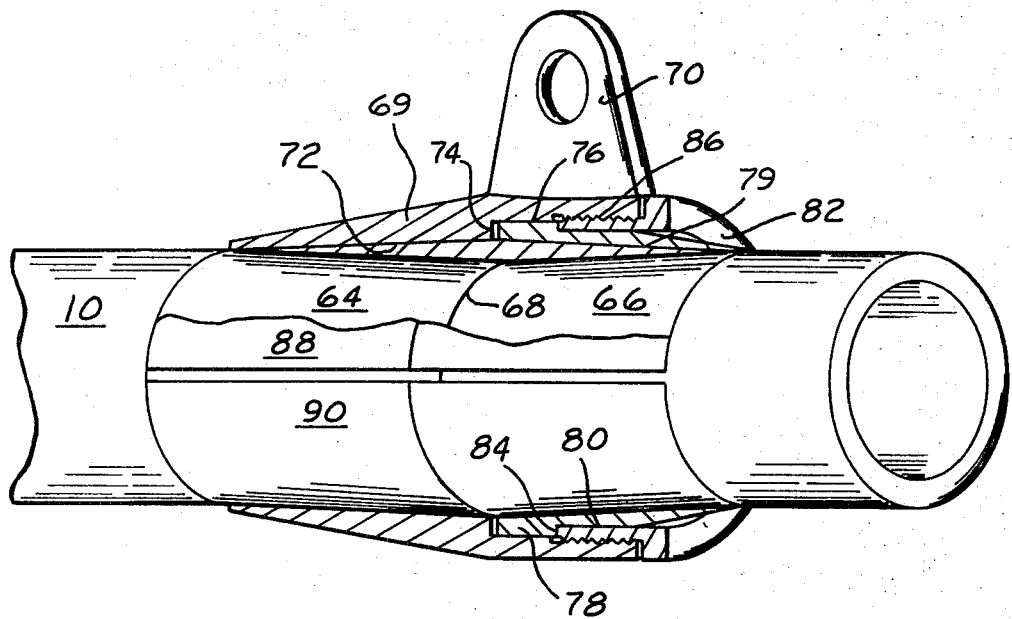
FIG. 3 represents an orthographic view of a third embodiment of the present invention.

Referring to FIG. 3, the present invention is shown in modified form and, like FIG. 1, adapted for installation on the exterior or tubular member 10. The exterior wall of tubular member 10 is provided with a reduced diameter section defined by conical or ramp sections 64 and 66 which taper radially inwardly as shown to a common vertex 68. Tubular fitting 69 provided with integral lug portion 70 has an interior wall 72 of cone or funnel shape which tapers radially outwardly from conical section 64 and terminates at the end wall 74 of an annular recess 76 thereby defining a progressively increasing spaced relationship between wall 72 and conical section 64. An annular bushing 78 slidably received by annular recess 76 is provided with a cone or funnel shaped inner wall 79 which tapers radially inwardly from conical section 66 thereby defining a progressively increasing spaced relationship between wall 79 and conical section 66. An annular recess 80 in the outermost wall of bushing 78 provides adequate spacing for entry of an annular spanner nut 82 between bushing 78 and tubular fitting 69 which spanner but 82 bears against end wall 84 of recess 80 and is threadedly engaged with a threaded portion 86 of tubular fitting 69. An annular split collet or sleeve defined by half sections 88 and 90 is interposed between conical sections 64, 66 and respective walls 72, 79 adjacent thereto. As viewed in cross section, the half sections 88 and 90 are wedge shaped and progressively increase in thickness from ends thereof to a maximum at the mid portion thereof in accordance with the angle of divergence between conical section 64 and wall 72 and the angle of divergence of conical section 66 and wall 79 thereby wedging the half sections 88 and 90 tightly in position against tubular member 10 as the annular bushing 78 and tubular fitting 69 are drawn together by virtue of tightening spanner nut 82.

Figure 4:
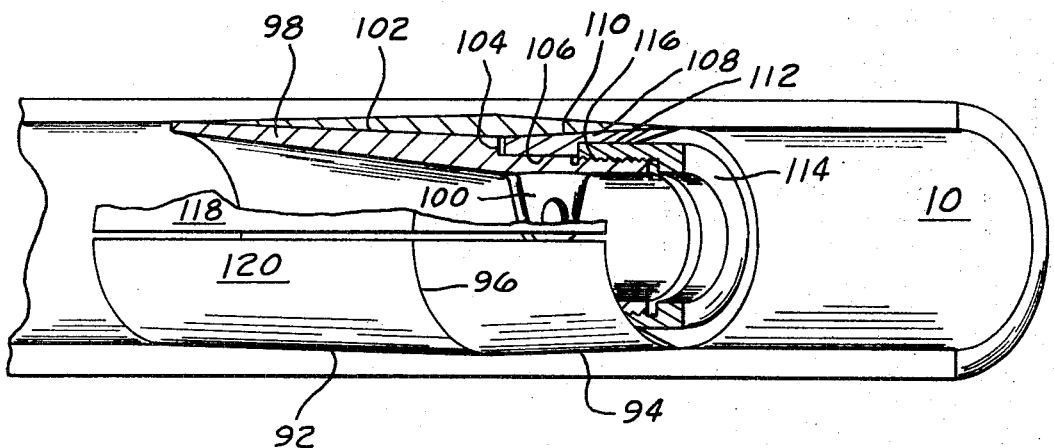
FIG. 4 represents an orthographic view of a fourth embodiment of the present invention.

Referring to FIG. 4, the structure of FIG. 3 is modified to provide installation thereof on the interior of tubular member 10. To that end, the interior wall of tubular member 10 is recessed to provide conical or ramp sections 92 and 94 which taper radially outwardly to a common base 96. Tubular fitting 98 provided with lug portion 100 extending radially inwardly therefrom has an exterior wall of cone or funnel shape 102 which tapers radially inwardly relative to conical section 92 and terminates at the end wall 104 of an annular recess 106 formed on the end of tubular fitting 98. Annular bushing 108 slidably received by annular recess 106 is provided with a cone or funnel shaped outer wall 110 which tapers radially inwardly relative to conical section 94. Annular recess 112 formed in the innermost wall of bushing 108 receives annular spanner nut 114 which threadedly engages a threaded portion 116 of tubular fitting 98. An annular collet or sleeve defined by half sections 118 and 120 identical to half sections 88 and 90 of FIG. 3 except for a reduced diameter is interposed between conical sections 92, 94 and walls 102, 110, respectively. As in the case of FIG. 3, half sections 118 and 120 are tightly wedged against tubular member 10 as the tubular fitting 98 and annular bushing 108 are drawn together in response to tightening of spanner nut 114.

Assembly of the structure of FIG. 3 or 4 is accomplished in the same manner. For example, referring to FIG. 3, the tubular fitting 69 is slipped on tubular member 10 to a position clearing the reduced diameter section defined by conical sections 64 and 66. The half sections 88 and 90 are inserted in position against conical sections 64 and 66 and tubular fitting 68 retracted to bear against half sections 88 and 90. The annular bushing 78 is inserted in annular recess 76 and spanner nut 82 threaded on tubular fitting 69 to bear against end wall 84. The spanner nut 82 is then tightened by means of a suitable wrench to draw the annular bushing 78 as well as tubular fitting 69 into positive engagement with half sections 88 and 90 thereby locking the component structure securely in position on tubular member 10.

As in the case of FIG. 1, the various mating surfaces of the above described structure of FIGS. 2, 3 or 4 may be provided with a suitable adhesive such as a dry film adhesive or elastomer to further secure the assembly in position on tubular member 10.

Referring to FIGS. 1 and 2, it will be recognized that the split collet or sleeve portions thereof will not be required in the event that the tubular fitting 20 or 46 and associated annular bushings 32 or 58 can be telescoped over the respective opposite ends of tubular member 10. In such a case, the cone shaped wall portion of the tubular fitting can be brought to bear directly against the adjacent conical section of tubular member 10.

We claim:

1. A structure fitting for a filament composite tube comprising:
   first and second oppositely extending conical surface portions formed on a wall of said tube;
   a tubular member having a lug portion and a third conical surface portion adapted to engage said first conical surface portion;
   a ring member having a fourth conical surface portion adapted to engage said second conical surface portion;
   an abutment portion formed on said ring member;
   an annular recess formed in said tubular member adapted to slidably receive said abutment portion and provided with a threaded portion at one end thereof; and
   an annular nut threadedly engaged with said threaded portion and engageable with said abutment portion for drawing said ring member into positive engagement with said second conical surface and said tubular member into positive engagement with said first conical surface portion.

2. A structural fitting for a filament composite tube as claimed in claim 1, wherein:
   said abutment portion is a radially extending annular shoulder engaged by said annular nut.

3. A structural fitting for a filament composite tube as claimed in claim 1, wherein:
   said third conical surface portion is concentric with said first conical surface portion and bears against a sleeve member interposed between said first and third conical surface portions.

4. A structural fitting for a filament composite tube as claimed in claim 3, wherein:
   said tubular member is adapted to telescope relative to said first and second conical surface portions in the absence of said sleeve member.

5. A structural fitting for a filament composite tube as claimed in claim 3, wherein:
   said sleeve member is segmented to permit axial movement thereof along said tube to a predetermined position thereon.

6. A structural fitting for a filament composite tube as claimed in claim 1, and further including:
   an adhesive bonding said first and second conical surface portions to said third and fourth conical surface portions, respectively.

7. A structural fitting for a filament composite tube as claimed in claim 1, wherein:
   said first and second conical surface portions are formed on the outer wall of said tube;
   said tubular member and ring member surrounding said tube.

8. A structural fitting for a filament composite tube as claimed in claim 1, wherein:
   said first and second conical surface portions are formed on the inner wall of said tube;
   said tubular member and ring member being surrounded by said tube.

9. A structural fitting for a filament composite tube as claimed in claim 1, wherein:
   said first and second conical surface portions have a common base.

10. A structural fitting for a filament composite tube as claimed in claim 1, and further including:
    a sleeve member interposed between said first and second conical surface portions and corresponding adjacent third and fourth conical surface portions.

11. A structural fitting for a filament composite tube as claimed in claim 10, wherein:
    said first and third conical surface portions as well as said second and fourth conical surface portions diverge; and
    said sleeve member tapers in accordance with said diverging first and third and diverging second and fourth conical surface portions to provide bearing surfaces for each of said first, second, third and fourth conical bearing surfaces.

12. A structural fitting for a filament composite tube as claimed in claim 11, wherein:
    said sleeve member is wedged progressively tighter against said tube member, said tubular member and said ring member in response to tightening of said annular nut.

13. A structural fitting for a filament composite tube as claimed in claim 10, wherein:
    said sleeve member is split longitudinally to permit axial movement thereof along said tube to predetermined position thereon.

14. A structural fitting for a filament composite tube as claimed in claim 10, wherein:
    said sleeve member surrounds said tube member.

15. A structural fitting for a filament composite tube as claimed in claim 10, wherein:
    said sleeve member is surrounded by said tube member.

16. A structural fitting for a filament composite tube as claimed in claim 1, wherein:
    said first and second conical surface portions have a common vertex.

* * * * *